United States Patent Office 2,742,462
Patented Apr. 17, 1956

2,742,462
NEW N-(5-NITRO-2-FURFURYLIDENE)-3-AMINO-2-OXAZOLIDONES

Gabriel Gever, Oxford, N. Y., assignor, by mesne assignments, to The Norwich Pharmacal Company, Norwich, N. Y., a corporation of New York No Drawing. Application February 28, 1952,
Serial No. 274,066

6 Claims. (Cl. 260—240)

This invention relates to a new series of chemical compounds which exhibit a high order of in vivo chemotherapeutic effectiveness against microbial infections upon oral administration and which are well tolerated by the host when so administered. The series consists of a number of closely related N-(5-nitro-2-furfurylidene)-3-amino-2-oxazolidones. They are described by the general formula:

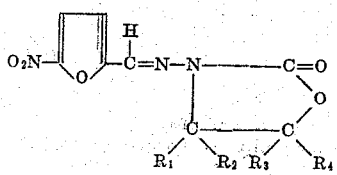

in which $R_1$ is a member of the group consisting of hydrogen, lower alkyl, hydroxy (lower) alkyl and halogeno (lower) alkyl $R_2$ is a member of the group consisting of hydrogen, lower alkyl, hydroxy (lower) alkyl and halogeno (lower) alkyl $R_3$ is a member of the group consisting of hydrogen, lower alkyl, hydroxy (lower) alkyl and halogeno (lower) alkyl $R_4$ is a member of the group consisting of hydrogen, lower alkyl, hydroxy (lower) alkyl and halogeno (lower) alkyl It is known that nitrofurans as a class possess antibacterial activity. Those antibacterial nitrofurans may be placed in two groups: (1) Compounds whose use has been limited to local administration; and (2) Compounds which also exhibit chemotherapeutic activity upon oral administration. In the past, the compounds in the second group have possessed an objectionable characteristic in that, when administered in sufficient quantity to serve as effective chemotherapeutic agents, they have frequently caused nausea and vomiting. This has imposed a distinct limitation upon the use of such compounds.

I have made the surprising discovery that the series of N-(5-nitro-2-furfurylidene)-3-amino-2-oxazolidones referred to above, while possessing the high order of antibacterial activity of past nitrofurans and the chemotherapeutic effectiveness that characterizes the group of past nitrofurans which could be administered orally, differ markedly therefrom in that they are remarkedly free from the untoward and unwanted effects of nausea and vomiting when administered orally in amount sufficient to afford protection of a high order. Their use is not attended by the danger that the recipient of a drug made therefrom may be unable to retain it and allow it to perform its desired therapeutic function.

The members of my new series of compounds have proved, in the treatment of animals lethally infected with pathogenic organisms, to be possessed of curative properties of an astonishingly high order. Protection of the order of 100% is afforded, post infection, to animals lethally infected with S. typhosa and V. comma. Salmonella is the causative agent of typhoid fever for which no truly successful chemotherapeutic agent has yet emerged. The V. comma bacillus is the causative agent of cholera, a disease of epidemic proportions in some countries. The dosage, per os, necessary to obtain a high order of chemotherapeutic protection in animals lethally infected with these organisms is most tolerable and provokes no manifestation of toxic response. The high therapeutic index of the members of my new series of compounds permits dosages to be well spaced at time intervals in keeping with accepted modes of therapy—an initial dose being followed by further doses at determined intervals; and, in some cases, an initial dose may serve as the only administration thereof, the same high order of chemotherapeutic effectiveness being derived from the single dose as from multiple repeated doses.

The formulation of the members of my new series of compounds in a manner which will permit oral administration thereof is easy. The particular compound selected for use may be incorporated in tablets or in lozenges. Such tablets are compounded in conventional fashion by granulating the compound with standard starch paste, drying, adding dry starch and pressing out the tablets. The lozenges are compounded in conventional fashion also, by granulating with sugar syrup and then adding bulk in the form of powdered sugar and dry starch, and a flavoring material.

The various members of the new series of compounds which I have invented differ from each other somewhat in degree of chemotherapeutic effectiveness. The one which I now prefer and with which I have secured excellent results is N-(5-nitro-2-furfurylidene)-3-amino-2-oxazolidone. Tablets or lozenges containing that compound, when administered orally, are well tolerated and exhibit extraordinary chemotherapeutic effectiveness.

The method which I now prefer to follow in preparing the members of my new series of compounds comprises condensing a suitable 3-amino-2-oxazolidone compound with 5-nitro-2-furaldehyde, its reactive derivatives such as 5-nitro-2-furaldehyde diacetate. Other methods of producing my new compounds use, as starting materials, 5-nitro-2-furfurylidene hydrazino compounds of the formula:

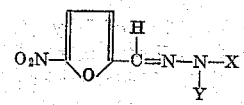

in which X and Y are substituents which are capable, either by condensing with themselves or by reacting with other suitable compounds, of forming an oxazolidone ring and producing a compound described by the general formula first above mentioned.

Many of the 3-amino-2-oxazolidones used as starting materials in the preparation of my new series of compounds are new, per se. Such compounds and the preparation thereof form the subject of U. S. Patent No. 2,652,402, issued on my co-pending application, Serial No. 274,067 filed February 28, 1952.

In order that my invention may be entirely available to those skilled in the art, methods for making a number of the new compounds of the series are described briefly.

EXAMPLE I

N-(5-nitro-2-furfurylidene)-3-amino-2-oxazolidone

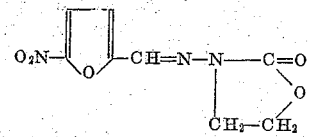

A. A solution of 1.8 g. of sodium in 25 cc. of anhydrous methanol is added to a mixture of 46 g. of 2-hydroxyethylhydrazine and 90 cc. of diethyl carbonate. The resulting solution is refluxed for three hours and then cooled to room temperature. From this point, two alternative procedures can be followed to obtain the N-(5-nitro-2-furfurylidene)-3-amino-2-oxazolidone.

1. To the above reaction mixture is added 375 cc. of alcohol and 25 cc. of concentrated hydrochloric acid. This solution is then added, with stirring, to a solution of 75 g. of 5-nitro-2-furaldehyde in 750 cc. of alcohol. The resulting mixture is stirred for one hour and then filtered. The yellow solid is washed with water and then with alcohol. After drying, 107 g., 79% of N-(5-nitro-2-furfurylidene)-3-amino-2-oxazolidone is obtained. Recrystallization from N,N-dimethylformamide yields a product with a melting point of 256–257° C.

2. To the original reaction mixture is added 40 cc. of alcohol, 240 cc. of water, 38 g. of sulfuric acid and 127 g. of 5-nitro-2-furaldehyde diacetate. This mixture is stirred at reflux for one hour, cooled to room temperature and then filtered. The yellow solid is washed with water and then with alcohol. After drying, 103 g., 76% of N-(5-nitro-2-furfurylidene)-3-amino-2-oxazolidone is obtained. Recrystallization from N,N-dimethylformamide yields a product with a melting point of 256–257° C.

B. To 100 g. of 5-nitro-2-furaldehyde 2-(2-hydroxyethyl) semicarbazone suspended in 300 cc. of benzene is added, with vigorous stirring, a solution of 126 cc. of thionyl chloride in 360 cc. of benzene. The mixture is warmed at 50–65° for 90 minutes and then allowed to stand at room temperature over night. The solids are removed by filtration, washed with benzene and then with alcohol. After drying, the yield of N-(5-nitro-2-furfurylidene)-3-amino-2-iminooxazolidine hydrochloride is 103 g., 95% M. P. 175–185° C.

A solution of 51 g. of N-(5-nitro-2-furfurylidene)-3-amino-2-iminooxazolidine hydrochloride in 1000 cc. of water is filtered to remove any insoluble material and then refluxed for one hour, crystals separating out after a short period of boiling. The mixture is filtered hot and the yellow insoluble solid washed with water and then with alcohol. After drying, the N-(5-nitro-2-furfurylidene)-3-amino-2-oxazolidone amounts to 21.8 g., 54.5%, M. P. 254–256° C.

C. A solution of 10 g. of 2-hydroxyethylhydrazine in 25 cc. of alcohol is adjusted to pH 6 with alcoholic hydrogen chloride. To this is slowly added a solution of 5-nitro-2-furaldehyde in 25 cc. of alcohol, keeping the temperature at 25–30° C. This solution is treated dropwise over a period of 20–25 minutes, with 24.8 g. of ethyl chloroformate, the temperature being maintained at 28–32° C. After stirring at 30° C. for 70 minutes, the solution is cooled in an ice bath for 30 minutes and the solid which separates is filtered off. The reddish crystals are recrystallized from alcohol, giving 12.4 g. of N-(5-nitro-2-furfurylidene)-N'-carbethoxy-N'-(2-hydroxyethyl) hydrazine. The latter, when dissolved in dioxane and added to a dilute solution of sodium carbonate in water gives a precipitate of N-(5-nitro-2-furfurylidene)-3-amino-2-oxazolidone.

D. 3-nitro-2-oxazolidone is reduced electrolytically, using 160 cc. of 10% sulfuric acid as the catholyte, a lead anode, a mercury pool cathode and a current density of 0.204 amp./cm.² for one hour at a temperature of 5–10° C. At the end of this time the aqueous solution is separated from the mercury and treated with an alcoholic solution of 5-nitro-2-furaldehyde. In this manner a yield of 43% of N-(5-nitro-2-furfurylidene)-3-amino-2-oxazolidone, M. P. 256–257° C. is obtained.

EXAMPLE II

N-(5-nitro-2-furfurylidene)-3-amino-5-methyl-2-oxazolidone

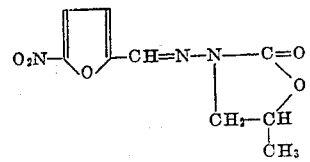

Using 45.0 g. of 2-hydroxypropylhydrazine (prepared by the condensation of propylene chlorohydrin with hydrazine hydrate), 74 cc. of diethyl carbonate, a solution of 1.4 g. of sodium in 16 cc. of anhydrous methanol and the procedure described in Example I, method A (1), there is obtained 85 g. (70.4% yield) of N-(5-nitro-2-furfurylidene) - 3 - amino-5-methyl-2-oxazolidone, M. P. 255–256° C.

EXAMPLE III

N-(5-nitro-2-furfurylidene)-3-amino-4-methyl-2-oxazolidone

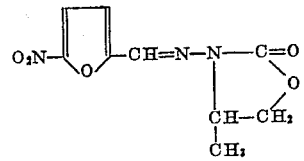

Using 11.6 g. of 2-hydrazino-1-propanol (prepared by the reduction of ethyl α-hydrazinopropionate with lithium aluminum hydride), 17 g. of diethyl carbonate, a solution of 1.0 g. of sodium in 10 cc. of anhydrous methanol and the procedure described in Example I, method A (1), there is obtained 11.0 g., 36%, of N-(5-nitro-2-furfurylidene)-3-amino-4-methyl-2-oxazolidone, M. P. 199–200° C.

EXAMPLE IV

N-(5-nitro-2-furfurylidene)-3-amino-5-butyl-2-oxazolidone

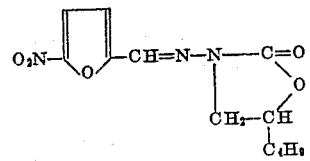

Using 4.7 g. of 1-hydrazino-2-hexanol (prepared by the condensation of 2-bromohexanol with hydrazine hydrate), 5.0 g. of diethyl carbonate, a solution of 0.1 g. of sodium in 3 cc. of anhydrous methanol and the procedure described in Example I, method A (1), there is obtained 4.6 g. (46%) of N-(5-nitro-2-furfurylidene)-3-amino-5-butyl-2-oxazolidone, M. P. 194°.

EXAMPLE V

N-(5-nitro-2-furfurylidene)-3-amino-4-butyl-2-oxazolidone

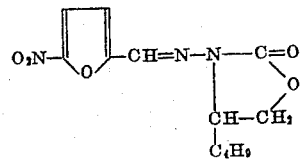

Using 5.5 g. of 2-hydrazino-1-hexanol (prepared by the reduction of ethyl α-hydrazinocaproate with lithium aluminum hydride), 6.5 g. of diethyl carbonate, a solution of 0.2 g. of sodium in 5.6 cc. of anhydrous methanol and the procedure described in Example I, method A (1), there is obtained 4.9 g., 42% of N-(5-nitro-2-furfurylidene)-3-amino-4-butyl-2-oxazolidone, M. P. 150°–151° C.

EXAMPLE VI

*N-(5-nitro-2-furfurylidene)-3-amino-5-ethyl-2-oxazolidone*

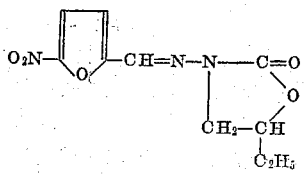

Using 14.4 g. of 1-hydrazino-2-butanol (prepared by the condensation of 1,2-epoxybutane with hydrazine hydrate), 18 g. of diethyl carbonate, a solution of 1.0 g. of sodium in 10 cc. of anhydrous methanol and the procedure described in Example I, method A (1), there is obtained 21.8 g. 62% of N-5-nitro-2-furfurylidene)-3-amino-5-ethyl-2-oxazolidone, M. P. 215–216°.

EXAMPLE VII

*N-(5-nitro-2-furfurylidene)-3-amino-4,4-dimethyl-2-oxazolidone*

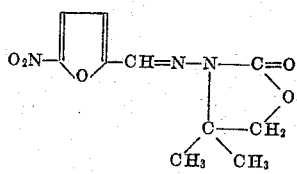

Using 3.96 g. of 4,4-dimethyl-3-nitro-2-oxazolidone (prepared by the nitration of 4,4-dimethyl-2-oxazolidone), and the procedure described in Example I, method D, there is obtained 2.79 g., 45%, of N-(5-nitro-2-furfurylidene)-3-amino-4,4-dimethyl-2-oxazolidone, M. P. 152–153° C.

EXAMPLE VIII

*N-(5-nitro-2-urfurylidene)-3-amino-4,4-dimethyl-methyl-2-oxazolidone*

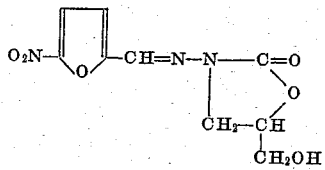

A solution of 43 g. of sodium hydroxide in 250 g. of hydrazine hydrate (100%) is warmed to 44° and then treated with 110 g. of glycerol α-monochlorohydrin, dropwise, over a period of 35 minutes, keeping the temperature at 85–90° C. by the rate of addition. The reaction mixture is heated on the steam bath for 30 minutes and then allowed to remain at room temperature overnight. The excess hydrazine is removed by vacuum distillation, the residue diluted with absolute alcohol and the precipitated sodium chloride removed by filtration. The alcoholic filtrate is then refluxed with diethyl carbonate and sodium ethoxide and the procedure described in Example I, method A (1), followed to give N-(5-nitro-2-furfurylidene)-3-amino-5-hydroxymethyl-2-oxazolidone, M. P. 241–243° C.

EXAMPLE IX

*N-(5-nitro-2-furfurylidene)-3-amino-5-chloro-methyl-2-oxazolidone*

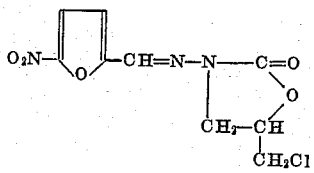

A. Using 10 g. of 5-nitro-2-furaldehyde in 50 cc. of alcohol, a solution of 10.7 g. of 3-amino-5-chloromethyl-2-oxazolidone (Paterno and Cingolani, Gazz. Chim. Ital. 38, 1245 (1908); Beilstein, vol. 27, p. 145) and the procedure described in Example I, method A (1), there is obtained a quantitative yield of N-(5-nitro-2-furfurylidene)-3-amino-5-chloromethyl-2-oxazolidone, M. P. 196–197° C.

B. Treatment of N-(5-nitro-2-furfurylidene)-3-amino-5-hydroxymethyl-2-oxazolidone (Example VIII) with a chloroform solution of thionyl chloride in the presence of pyridine yields N - (5-nitro-2-furfurylidene) - 3-amino-5-chloromethyl-2-oxazolidone, M. P. 195–196° C.

EXAMPLE X

*N-(5-nitro-2-furfurylidene)-3-amino-4,5-dimethyl-2-oxazolidone*

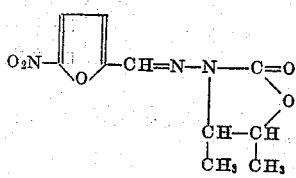

Using 50.4 g. of 3-hydrazino-2-butanol (prepared by the condensation of 2,3-epoxybutane with hydrazine hydrate), 63 g. of diethyl carbonate, a solution of 3.5 g. of sodium in 35 cc. of anhydrous methanol and the procedure described in Example I, method A (1), there is obtained 80 g. of N-(5-nitro-2-furfurylidene)-3-amino-4,5-dimethyl-2-oxazolidone, M. P. 143–144° C.

What I claim is:

1. A chemical compound having chemotherapeutic activity on oral administration and represented by the formula:

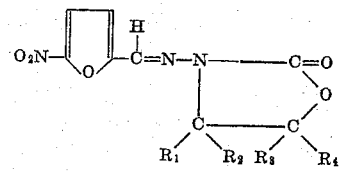

in which $R_1$ is a member of the group consisting of hydrogen, lower alkyl, hydroxy (lower) alkyl and halogeno (lower) alkyl $R_2$ is a member of the group consisting of hydrogen, lower alkyl, hydroxy (lower) alkyl and halogeno (lower) alkyl $R_3$ is a member of the group consisting of hydrogen, lower alkyl, hydroxy (lower) alkyl and halogeno (lower) alkyl $R_4$ is a member of the group consisting of hydrogen, lower alkyl, hydroxy (lower) alkyl and halogeno (lower) alkyl 2. N - (5-nitro-2-furfurylidene)-3-amino-2-oxazolidone represented by the formula:

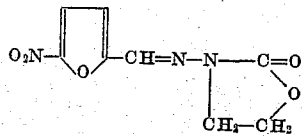

3. N - (5 - nitro - 2-furfurylidene)-3-amino-5-hydroxymethyl-2-oxazolidone represented by the formula:

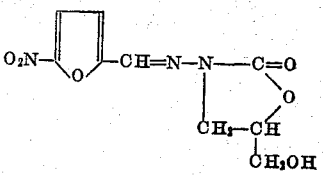

4. N-(5-nitro-2-furfurylidene)-3-amino-5-chloromethyl-2-oxazolidone represented by the formula:
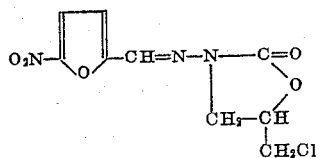
5. N-(5-nitro-2-furfurylidene)-3-amino-4,5-dimethyl-2-oxazolidone represented by the formula:
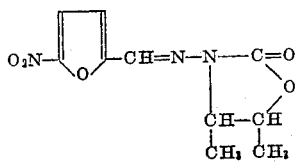
6. N-(5-nitro-2-furfurylidene)-3-amino-5-methyl-2-oxazolidone represented by the formula:
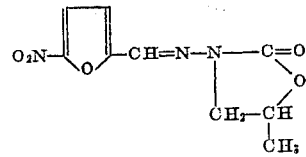
References Cited in the file of this patent
UNITED STATES PATENTS
| | | |
|---|---|---|
| 2,484,503 | Hamer | Oct. 11, 1949 |
| 2,519,001 | Sprague | Aug. 15, 1950 |
| 2,553,494 | Anish | May 15, 1951 |
| 2,610,181 | Hayes | Sept. 9, 1952 |